(12) United States Patent
Hada

(10) Patent No.: US 8,723,973 B2
(45) Date of Patent: May 13, 2014

(54) IMAGING APPARATUS USING A RECORDING MEDIUM WITH A FUNCTION TO TRANSMIT IMAGE DATA RECORDED IN A PREDETERMINED FOLDER TO AN EXTERNAL DEVICE, AND RECORDING REDUCED IMAGE DATA IN A FOLDER DIFFERENT FROM THE PREDETERMINED FOLDER AFTER TRANSMITTING THE IMAGE DATA, AND CONTROL METHOD AND NON-TRANSITORY COMPUTER READABLE STORAGE MEDIUM THEREOF

(75) Inventor: Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/891,657

(22) Filed: Sep. 27, 2010

(65) Prior Publication Data

US 2011/0074964 A1 Mar. 31, 2011

(30) Foreign Application Priority Data

Sep. 29, 2009 (JP) ................................. 2009-224769

(51) Int. Cl.
*H04N 5/232* (2006.01)
(52) U.S. Cl.
USPC ..................... 348/211.2; 348/231.2; 348/241
(58) Field of Classification Search
USPC .................................... 348/211.2, 231.2, 241
See application file for complete search history.

(56) References Cited

U.S. PATENT DOCUMENTS

2002/0021359 A1* 2/2002 Okamoto ..................... 348/222
2006/0085385 A1* 4/2006 Foster et al. ..................... 707/1
2008/0209519 A1* 8/2008 Michio ............................ 726/3

FOREIGN PATENT DOCUMENTS

JP 2002-016865 A 1/2002

* cited by examiner

*Primary Examiner* — Usman Khan
(74) *Attorney, Agent, or Firm* — Canon U.S.A., Inc. IP Division

(57) ABSTRACT

When a photographed image is recorded using a detachable recording medium having a transmission function, to easily distinguish an image corresponding to the transmitted image and an image corresponding to the image that has not been transmitted yet, when the image data is recorded in the recording medium having a wireless communication unit, the image corresponding to the transmitted image and the image corresponding to the image that has not been transmitted yet are separated and stored in separated folders formed on the recording medium. For example, the image data is stored in the DCIM2 folder and the DCIM folder. When the image data is stored, the image data corresponding to the transmitted image data is reduced and stored in the DCIM2 folder, while the image data corresponding to the transmitted image data is deleted from the DCIM folder.

6 Claims, 10 Drawing Sheets

IMAGING APPARATUS USING A RECORDING MEDIUM WITH A FUNCTION TO TRANSMIT IMAGE DATA RECORDED IN A PREDETERMINED FOLDER TO AN EXTERNAL DEVICE, AND RECORDING REDUCED IMAGE DATA IN A FOLDER DIFFERENT FROM THE PREDETERMINED FOLDER AFTER TRANSMITTING THE IMAGE DATA, AND CONTROL METHOD AND NON-TRANSITORY COMPUTER READABLE STORAGE MEDIUM THEREOF

BACKGROUND OF THE INVENTION

1. Field of the Invention

The present invention relates to an imaging apparatus, a control method and a program thereof, and more specifically, to an imaging apparatus, a control method and a program thereof suitable for using a recording medium having a transmission function as an image recording medium.

2. Description of the Related Art

A digital camera including a wireless communication device can wirelessly transmit captured image data to other digital cameras or servers. Japanese Patent Application Laid-Open No. 2002-016865 discusses a method in which a main image recorded in a recording medium is transmitted to other communication device and, when transmission is completed, the main image corresponding to the transmitted image and recorded in the recording medium is deleted, and then a reduced image of the main image is recorded.

Further, in recent years, a detachable recording medium having a wireless communication function has been realized. If this recording medium is used, even a digital camera including no wireless device can wirelessly transmit the captured image data.

However, in a case where the digital camera according to Japanese Patent Application Laid-Open No. 2002-016865, when a user checks the image recorded in the recording medium, the user cannot easily identify whether the image corresponding to the main image has been an already transmitted image or not.

Further, even when the image is transmitted using the detachable recording medium having the wireless communication function, since the recording medium automatically transmits the image captured by the digital camera, the user cannot easily identify whether the image corresponding to the main image has been a transmitted image or not.

Furthermore, in recent years, pixel number included in a liquid crystal display used for the digital camera has been increased, thereby quality of the liquid crystal display has been increasing. However, only for a purpose of viewing the image displayed on the liquid crystal display, an amount of image data having as much as millions of pixels is not necessary. In other words, if the image in a large size corresponding to the image having been transmitted to a personal computer is unnecessarily recorded in the digital camera, an amount of the image puts pressure on a storage capacity.

SUMMARY OF THE INVENTION

The present invention is directed to solve the above-described issues, or at least one of them.

According to an aspect of the present invention, an imaging apparatus includes a connector component which connects an imaging apparatus to a recording medium which has a wireless communication unit, a first recording unit configured to record photographed image data in a predetermined folder of a file system established in the recording medium, a reducing unit configured to, when the photographed image data recorded in the predetermined folder is transmitted by the recording medium, reduce the photographed image data to generate reduced image data, a second recording unit configured to record the reduced image data generated by the reducing unit in another folder, different from the predetermined folder, of the file system established in the recording medium, and a deletion unit configured to delete from the predetermined folder the photographed image data corresponding to the reduced image data generated by the reducing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates image numbers of image data stored in the DCIM folder.

FIG. 10 illustrates sorted image numbers of the image data stored in the DCIM folder and the DCIM2 folder.

DESCRIPTION OF THE EMBODIMENTS

Various exemplary embodiments, features, and aspects of the invention will be described in detail below with reference to the drawings.

Figure 1:
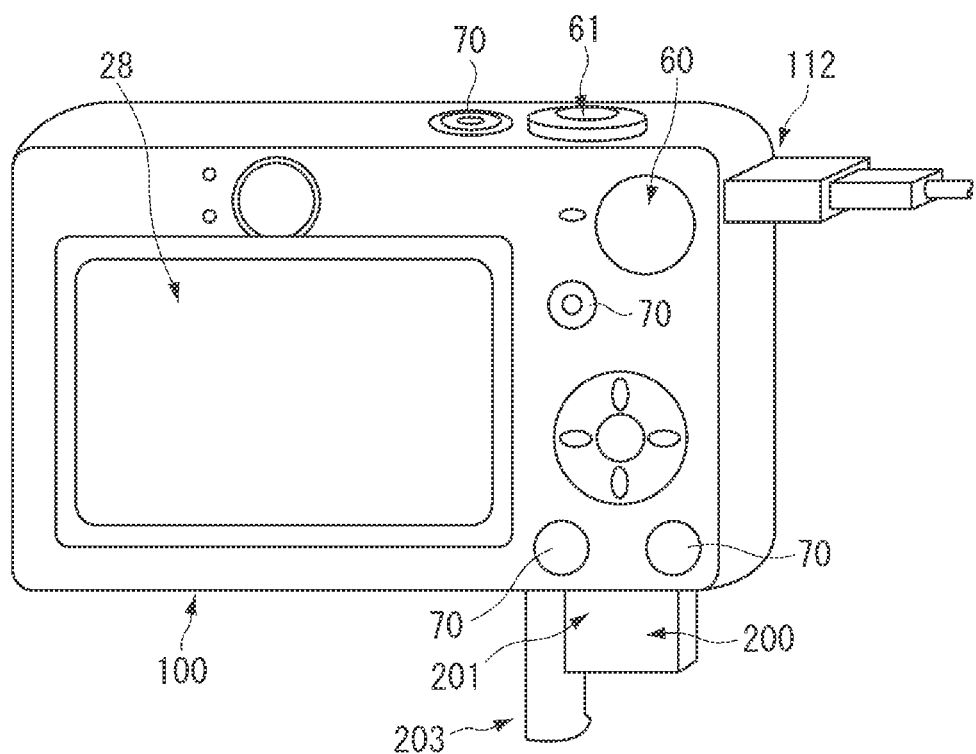
FIG. 1 is an external view illustrating an imaging apparatus (digital camera) according to an exemplary embodiment of the present invention.

FIG. 1 illustrates an external view of an imaging apparatus according to the exemplary embodiment of the present invention. The present imaging apparatus is constructed as a digital camera 100 and includes an image display unit 28 on a rear surface thereof. Images and various types of information are displayed on the image display unit 28. A shutter button 61 is an operation element of a shutter switch 62 (refer to FIG. 2) for giving instructions for photographing. A mode dial 60 is an operation element of a dial switch for switching various types of modes. A connector 112 electrically connects the digital camera 100 to an external device via a connection cable.

An operation unit 70 includes operating members such as a switch button and a touch panel, via which a user gives instructions of various types of operations. A recording medium 200 including, for example, a memory card and a hard disk records captured image data. According to the present exemplary embodiment, as the recording medium 200, it is assumed that a detachable recording medium having particularly an automatic transmission function such as an Eye-Fi Share (registered trademark) is used.

A recording medium slot 201 stores the recording medium 200. The recording medium 200 stored in the recording medium slot 201 can communicate with the digital camera 100. A lid 203 prevents foreign material such as dust from getting into the recording medium slot 201, when the recording medium slot 201 does not store the recording medium 200. Thus, the digital camera 100 can be safely mounted with the recording medium having the automatic transmission function.

Figure 2:
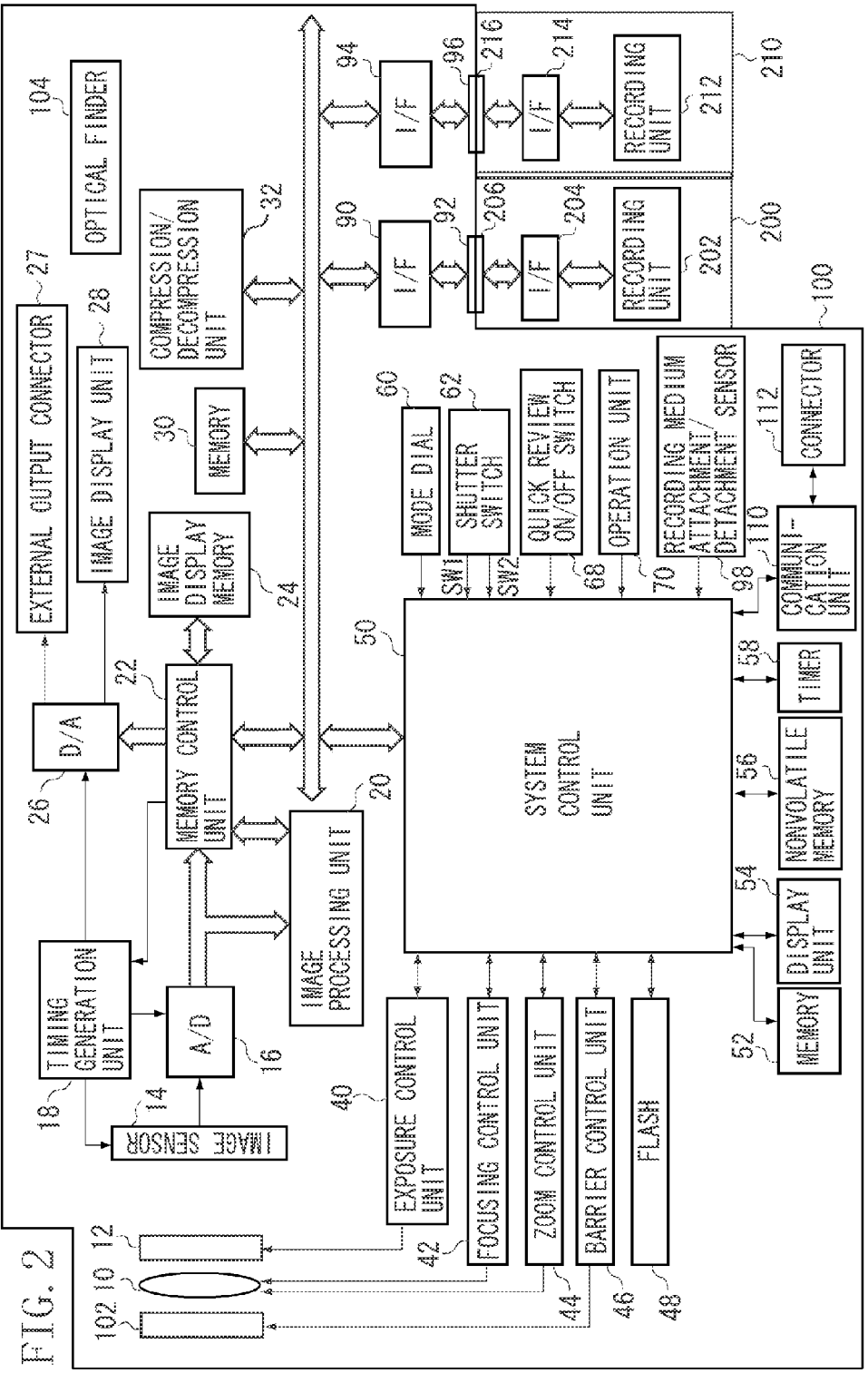
FIG. 2 is a block diagram illustrating a configuration of hardware of the digital camera.

FIG. 2 is a block diagram illustrating a configuration of hardware of the digital camera 100. FIG. 2 illustrates a photographic lens 10, a shutter 12 having a diaphragm function, an imaging sensor 14 that converts an optical image into electric signals, an analog/digital (A/D) converter 16 that converts analog signal output from the imaging sensor 14 into digital signals. Further, FIG. 2 illustrates a timing generation unit 18 that supplies clock signals and control signals to the imaging sensor 14, the A/D converter 16, and a digital analog (D/A) converter 26. The timing generation unit 18 is controlled by a memory control unit 22 and a system control unit 50.

An image processing unit 20 performs predetermined pixel interpolation processing and color conversion processing on image data from the A/D converter 16 or image data from the memory control unit 22. The image processing unit 20 performs predetermined calculation processing using photographed image data. Based on calculated results, the system control unit 50 performs auto focus (AF) processing, auto exposure (AE) processing, electronic flash preliminary emission (EF) processing, and auto white balance (AWB) processing of a through the lens (TTL) type.

A memory control unit 22 controls the A/D converter 16, the timing generation unit 18, the image processing unit 20, a image display memory 24, the D/A converter 26, a memory 30, and a compression/decompression unit 32. The memory control unit 22 performs control so that the image data from the A/D converter 16 is written into the image display memory 24 or the memory 30 via the image processing unit 20 or directly without passing through the image processing unit 20.

Via an external output connector 27 an output from the D/A converter 26 is output to an external monitor. An image display unit 28 includes a liquid crystal display (LCD). The memory control unit 22 supplies the image data, which is written into the image display memory 24, to the image display unit 28 via the D/A converter 26 to display the image data thereon. In this case, the captured image data is sequentially supplied to and displayed on the image display unit 28, which can thus function as an electronic finder.

The memory 30 records captured still images and moving images under the control of the memory control unit 22. The memory 30 is used as a working area of a system control unit 50 and a writing buffer when the image data is written into the recording media 200 and 210. A compression/decompression unit 32 compresses/decompresses the image data by an adaptive discrete cosine transform (ADCT). The compression/decompression unit 32 compresses or decompresses the image data under the control of the memory control unit 22 when the image data accesses the memory 30 and the recording media 200 and 210.

An exposure control unit 40 controls the shutter 12 having the diaphragm function and can adjust flash light in association with a flash 48. A focusing control unit 42 controls focusing of a photographic lens 10, a zooming control unit 44 controls zooming of the photographic lens 10, and a barrier control unit 46 controls operations of a barrier 102. A flash 48 emits autofocus (AF) auxiliary light and the flash light.

A system control unit 50 executes a program recorded in a non-volatile memory 56 to control an entire operation of the digital camera 100. This control includes recording processing performed on the image data illustrated in FIG. 4 and reproduction and display processing performed thereon illustrated in FIG. 5. A memory 52 develops constants and variations for operating the system control unit 50 and programs read from the non-volatile memory 56.

A display unit 54 includes an LCD and a speaker for displaying operation states and messages using letters, images, and audio, according to programs executed by the system control unit 50. The display unit 54 displays an attachment/detachment state of the recording media 200 and 210 in addition to diaphragm values and exposure correction values.

The non-volatile memory 56 can electrically delete and record memories. For example, an electronically erasable programmable read only memory (EEPROM) is used as the non-volatile memory 56. The non-volatile memory 56 stores constants and programs for operating the system control unit 50. A timer 58 measures a data recording speed of the recording media 200 and 210 and a data rate of data to be acquired.

The mode dial 60 can switch a function mode, for example, switch among a power-off mode, an automatically photographing mode, a photographing mode (including a panorama photographing mode and a moving image photographing mode), a reproduction mode, a multi-screen reproduction/deletion mode, and a PC connection mode. A shutter switch 62 includes a switch SW1 to be turned on with a first pressing stroke of a shutter button 61 and a switch SW2 to be turned on with a second pressing stroke, which is made by pressing further than the first pressing stroke.

When the switch SW1 is turned on, under the control of the system control unit 50, pre-photographing processing including the AF processing, the AE processing, and the AWB processing, and the EF processing is performed. When the switch SW2 is turned on, under the control of the system control unit 50, a series of photographing processing using the imaging sensor 14, the A/D converter 16, the image processing unit 20, the memory control unit 22, the memory 30, the compression/decompression unit 32, and the recording media 200 and 210 is performed. Further, in a case where the moving image is photographed, when the switch SW2 is turned on, the system control unit 50 performs control to start or stop photographing of the moving image.

A quick review on/off switch 68 sets a quick review function for automatically reproducing the photographed image data. An operation unit 70 includes various types of switches and touch panels. More specifically, the operation unit 70 includes a compression mode switch in addition to selecting/changing switches for setting selections and changing various types of functions, determination switches for determining and executing various types of functions, and a display switch for turning on and off the image display unit 28. The compression mode switch selects a compression rate of joint photographic expert group (JPEG) compression.

Interfaces 90 and 94 connect the digital camera 100 to the recording media 200 and 210 respectively. Connectors 92 and 96 connect the interfaces 90 and 94 to the recording media 200 and 210 respectively. A recording medium detachment sensor 98 detects whether the recording media 200 and 210 are mounted to the connector 92 and 96 respectively. According to the present exemplary embodiment, as described above, it is assumed that a detachable recording medium having the automatic transmission function is used as the recording medium 200.

A barrier 102 covers an imaging unit including the photographic lens 10 of the digital camera 100 to shield the imaging unit from dust or breakage. An optical finder 104 is also included in the digital camera 100. The recording media 200 and 210 include interfaces 204 and 214 and connectors 206 and 216 respectively, in addition to recording units 202 and 212 each including a semiconductor memory and a magnetic disk.

Figure 3:
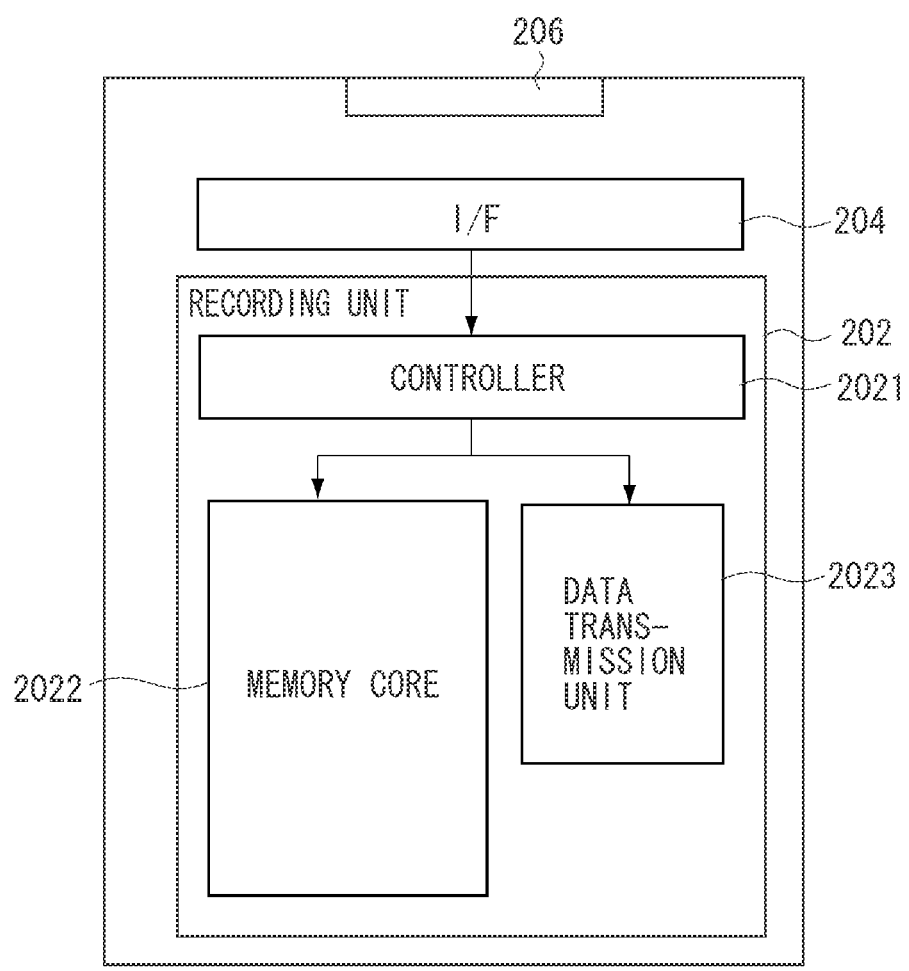
FIG. 3 is a block diagram illustrating a configuration of hardware of a recording medium that has a transmission function and is mounted on the digital camera.

FIG. 3 is a block diagram illustrating a configuration of hardware of the recording medium 200. As illustrated in FIG. 3, the recording medium 200 includes the recording unit 202, the interface 204, and the connector 206. The recording unit 202 includes a controller 2021, a memory core 2022, and a data transmission unit 2023.

The interface 204 is an interface unit for communicating with the digital camera 100. The connector 206 is a connecting member for physically connecting the recording medium 200 to the digital camera 100 which acts as a host apparatus.

The controller 2021 included in the recording unit 202 accesses the memory core 2022 according to commands input from the digital camera 100 via the interface 204. Further, the controller 2021 transmits the image data stored in a predetermined directory of a file system established in the recording medium (in the memory core 2022) to another digital camera and another server via the data transmission unit 2023. The memory core 2022 includes a non-volatile memory such as a flash EEPROM. The data transmission unit 2023 includes a wireless transmission device such as a wireless local area network (LAN).

According to the present exemplary embodiment, a design rule for the camera file system (DCF) standard is used as a standard of a file system described above. According to the DCF standard, a DCIM folder is specified as a root directory at the top level. Below the DCIM folder, folder names and file names are specified.

Further, according to the present exemplary embodiment, when the image is photographed, the digital camera 100 stores the JPEG image data acquired by compressing the photographed image in the DCIM folder included in the root directory in the memory core 2022 (first storage function). The controller 2021 of the recording medium 200 causes the data transmission unit 2023 to automatically transmit the image data corresponding to the JPEG image data stored in the DCIM folder to devices other than the digital camera 100.

Then, the digital camera 100 further compresses (reduces) the JPEG data corresponding to the automatically transmitted data to generate the reduced image data (JPEG image data). The digital camera 100 stores the reduced JPEG image data in the DCIM2 folder, which is separately prepared as a root directory (second storage function), and deletes the JPEG image data corresponding to the transmitted image data and stored in the DCIM folder.

Figure 4:
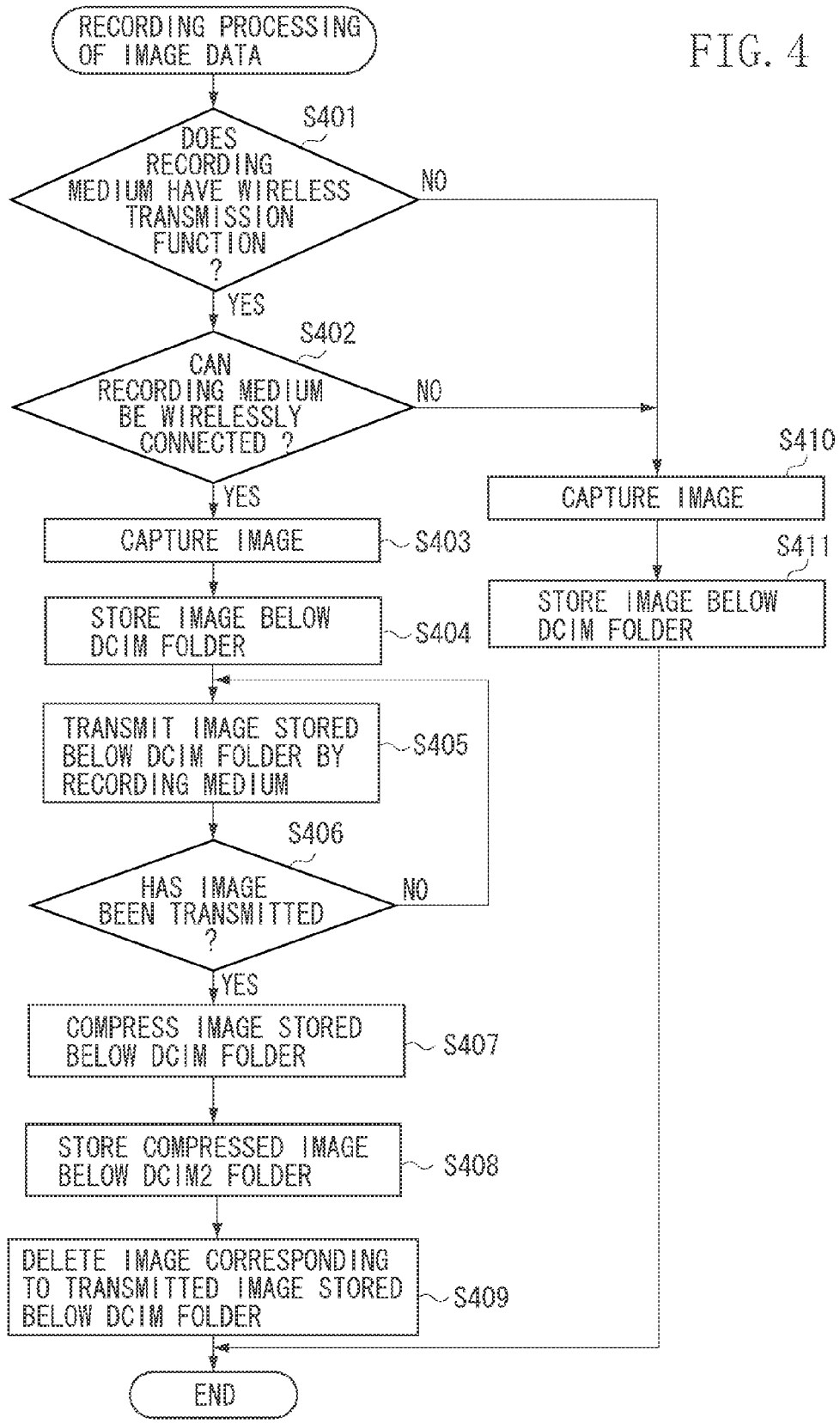
FIG. 4 is a flowchart illustrating recording processing to be performed on image data.

FIG. 4 is a flowchart illustrating processing for recording the image data in the recording medium 200 when the image is photographed.

In step S401, the system control unit 50 of the digital camera 100 determines whether the recording medium 200 includes the wireless transmission function. When the recording medium 200 does not include the wireless transmission function (NO in step S401), in step S410, the system control unit 50 executes photographing processing according to operations by the user. In step S411, the system control unit 50 causes the compression/decompression unit 32 to compress the photographed image data by the JPEG method and then stores the JPEG image data below the DCIM folder.

When the recording medium 200 includes the wireless transmission function (YES in step S401), in step S402, the system control unit 50 determines whether the recording medium 200 can be wirelessly connected to another device described above. When it is determined that the recording medium 200 cannot be wirelessly connected (NO in step s402), the system control unit 50 performs processing in steps S410 and S411 described above.

When it is determined that the recording medium 200 can be wirelessly connected (YES in step s402), in step S403, the system control unit 50 executes the photographing processing according to the operation by the user. Then, in step S404, the system control unit 50 causes the compression/decompression unit 32 to compress the photographed image data by the JPEG method and then stores the JPEG image data below the DCIM folder.

In this case, when there is no DCIM folder according to the DCF standard, the system control unit 50 generates the DCIM folder according thereto and stores the JPEG image data in the DCIM folder. Further, it is conceivable that the image data is not included in the DCIM folder but in the DCIM2 folder. In this case, the system control unit 50 applies an image number coming next to the largest image number applied to the image data stored in the DCIM2 folder, to the image data (JPEG image data) photographed this time and stores the JPEG image data below the DCIM folder.

In response to this storage processing, in step S405, the controller 2021 causes the data transmission unit 2023 to wirelessly transmit the JPEG image data stored in the DCIM folder, on which the storage processing is performed, to a predetermined devices other than the digital camera 100.

In step S406, the system control unit 50 determines whether the image data corresponding to the JPEG image data has been wirelessly transmitted. When the system control unit 50 determines that the image data has been wirelessly transmitted (YES in step S406), in step S407, the system control unit 50 reduces (e.g., creating thumbnails) a size of the JPEG image data corresponding to the transmitted data. Then, in step S408, the system control unit 50 stores the reduced image data below the DCIM2 folder.

In this case, a place for storing the reduced image data in the DCIM2 folder corresponds to a relative path below the DCIM folder. More specifically, when the image data stored in the DCIM folder is reduced and then stored in the DCIM2 folder, a directory structure or a file name (identification information) below the DCIM folder is used as it is to store the image data below the DCIM2 folder. For example, when the image data having a name of DCIM/100ABCDE/IMG_0001.JPEG is wirelessly transmitted, the system control unit 50 stores the reduced image data in a relative path having a name of DCIM2/100ABCDE/IMG_0001.JPEG.

When there is no DCIM2 folder for storing the reduced image data, the system control unit 50 newly generates a DCIM2 folder. Further, regarding information including a name of a file format applied to the reduced image data and a date and time when a file system is generated, the same information as that of the original JPEG image data stored below the DCIM folder in step S404 may be used.

According to the present exemplary embodiment, since the file system of the DCF standard is established, the exchangeable image file format (Exif) is used. Further, when the reduced image data is stored in the DCIM2 folder, the system control unit 50 applies information for prohibiting deletion of the reduced image data.

In step S409, the system control unit 50 deletes the JPEG image data corresponding to the image data wirelessly transmitted in step S405. More specifically, the JPEG image data which corresponds to the reduced image data stored below the DCIM2 folder and has not been reduced yet is deleted from the DCIM folder.

As described above, according to the present exemplary embodiment, since the image data corresponding to the data transmitted by the recording medium 200 and the image data corresponding to the image data that has not been transmitted yet are separated from each other and stored in separated folders, the transmitted image data and not transmitted data can be easily distinguished. Further, since the image data corresponding to the transmitted image data is reduced to be stored and the image data that has not been reduced is deleted, a memory capacity of the recording medium 200 can be conserved.

Figure 5:
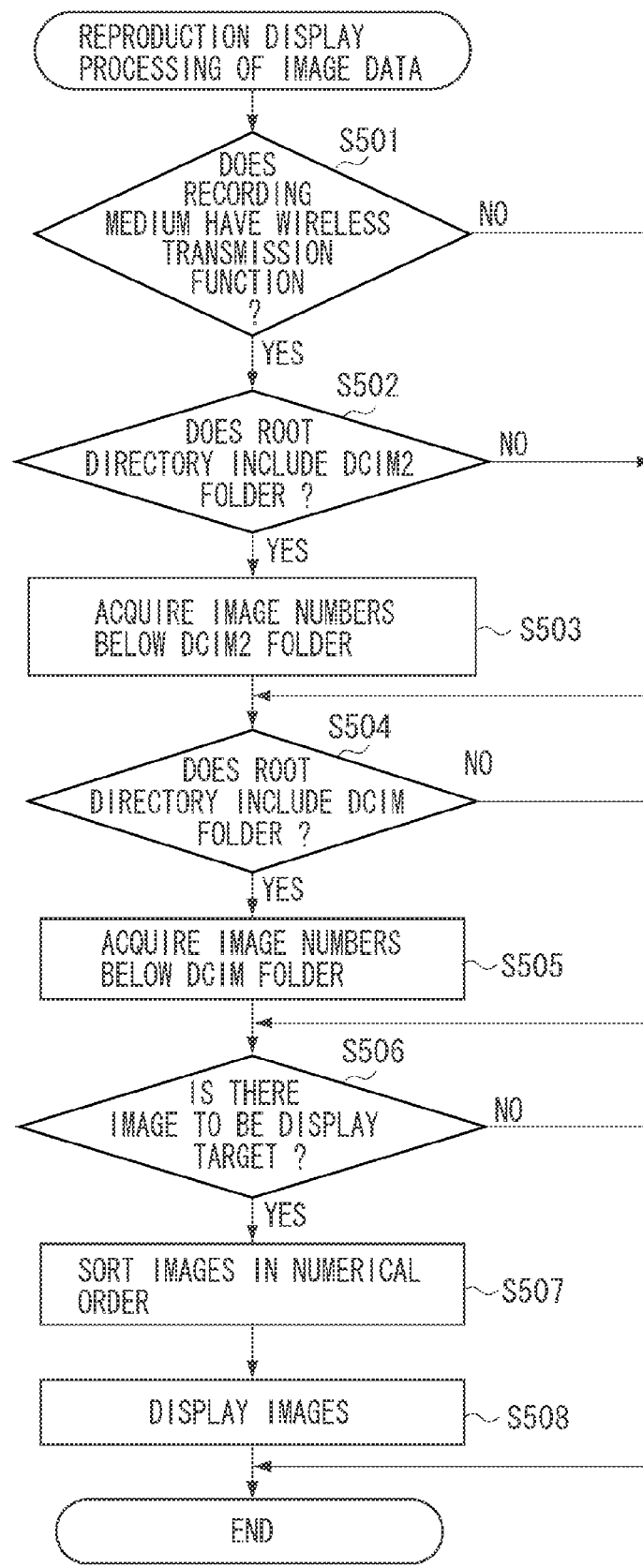
FIG. 5 is a flowchart illustrating reproduction and display processing to be performed on the image data.

Next, processing for reproducing and displaying the image data stored in the recording medium 200 on the image display unit 28 will be described based on a flowchart illustrated in FIG. 5.

When the reproduction mode is set by the mode dial 60, in step S501, the system control unit 50 determines whether the recording medium 200 has the wireless transmission function. When the system control unit 50 determines that the recording medium 200 does not have the wireless transmission function (NO in step S501), the processing proceeds to step S504. When the system control unit 50 determines that the recording medium 200 has the wireless transmission function (YES in step S501), in step S502, the system control unit 50 determines whether the root directory includes the DCIM2 folder. When the system control unit 50 determines that there is no DCIM2 folder (NO in step S502), the processing proceeds to step S504.

Figure 6:
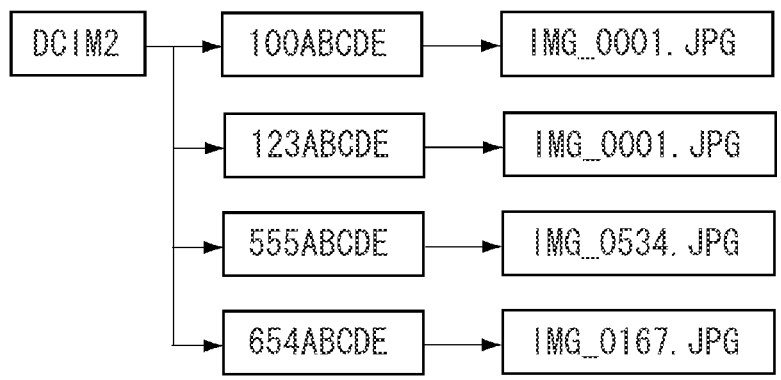
FIG. 6 illustrates a configuration of a DCIM2 folder.
Figure 7:
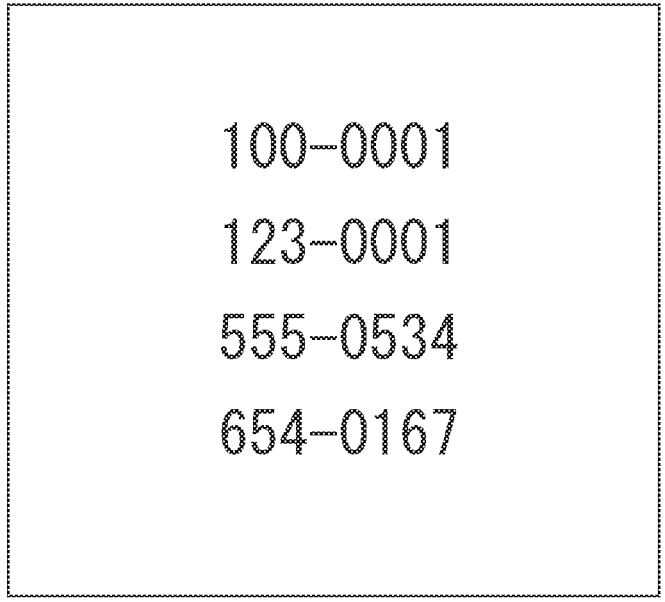
FIG. 7 illustrates image numbers of image data stored in the DCIM2 folder.

When the system control unit 50 determines that there is the DCOM2 folder (YES in step S502), in step S503, the system control unit 50 acquires the image number of the JPEG image data (reduced image data) stored below the DCIM2 folder, and the processing proceeds to step S504. In this case, the JPEG image data whose image number is acquired is stored at the place same as that described in step S408 illustrated in FIG. 4. For example, the image number of DCIM2/100ABCDE/IMG_0001.JPEG is 100-0001. An example of a structure of the DCIM2 folder where the image numbers to be acquired and examples of the acquired image numbers in step S503 are illustrated in FIGS. 6 and 7.

In step S504, the system control unit 50 determines whether the root directory includes the DCIM folder. When the system control unit 50 determines that the root directory does not include the DCIM folder, the processing proceeds to step S506. When the system control unit 50 determines that the root directory includes the DCIM folder, in step S505, the system control unit 50 acquires the image number of the JPEG image data stored below the DCIM folder, and then the processing proceeds to step S506. In this case, the system control unit 50 acquires only the image number of the JPEG image data according to the DCF standard but not the image number of other image data.

Figure 8:
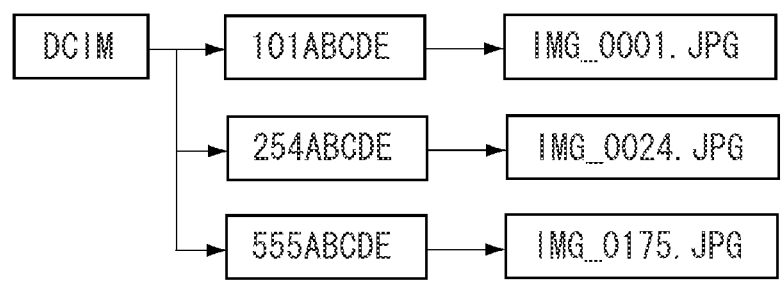
FIG. 8 illustrates a configuration of a DCIM folder.

For example, when the DCIM folder is structured as illustrated in FIG. 8, in step S505, the system control unit 50 acquires "101-0001" that is the image number of DCIM/101ABCDE/IMG_0001.JPEG as illustrated in FIG. 9.

In step S506, the system control unit 50 determines whether there is the image data to be displayed. When any image number cannot be acquired in steps S503 and S505, the system control unit 50 determines that there is no image data to be displayed.

When the system control unit 50 determines that there is no image data to be displayed (NO in step S506), the system control unit 50 ends this reproduction and display processing. When the system control unit 50 determines that there is image data to be displayed (YES in step S506), in step S507, the system control unit 50 sorts the image data based on the image numbers acquired in steps S503 and S505.

First, this sort processing is performed on the image numbers in ascending order based on folder numbers placed right below the DCIM folder or the DCIM2 folder, which are the first three-digit figures of the image numbers. Next, this sort processing is performed on the image numbers in ascending order based on the JPEG file numbers, which are the last four-digit figures of the image number. By this sort processing, when the image numbers acquired in steps S503 and S505 are included in the image numbers illustrated in FIGS. 7 and 9, the acquired image numbers corresponding to the image data are sorted as illustrated in FIG. 10.

After that, in step S508, the system control unit 50 displays the image data corresponding to the image numbers acquired in steps S503 and S505 on the image display unit 28. The image data to be displayed may be either of the first photographed image data or the last photographed image data. Further, when the user performs an image advancing operation via the operation unit 70, the image data is displayed in numerical order or reverse order of the image numbers sorted in step S507. When the user selects the image number, the image data corresponding to the image number is displayed.

As described above, according to the present exemplary embodiment, the image data corresponding to the transmitted image data is deleted from the DCIM folder. However, since its reduced data is stored in the DCIM2 folder, both images of the image data corresponding to the image data that has not been transmitted yet and the image data corresponding to the transmitted image can be reproduced.

Further, when the reduced data of the image data corresponding to the transmitted image data is stored below the DCIM2 folder, the folder number and the file number have the same structures as those when the image is stored in the DCIM folder. Therefore, even if the image numbers corresponding to the image data included in both of the DCIM folder and the DCIM2 folder are sorted all together, photographing orders can be maintained. Thus, the user can check the image data in photographing order or in reverse order.

Furthermore, since the image corresponding to the transmitted image is compressed to be stored, the capacity of the recording medium can be conserved.

The present invention is not limited to the above-described exemplary embodiment but can be also realized by following processing. More specifically, the present invention can be realized by processing for supplying software (program) that realizes functions of the above-described exemplary embodiments to the system or the apparatus via the network or various types of computer-readable storage media, and then a computer (or central processing unit (CPU), or micro-processing unit (MPU)) of the system or the apparatus reads and executes the program.

A wide variety of computer-readable storage media may be used to store the program. The computer-readable storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a non-volatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-224769 filed Sep. 29, 2009, which is hereby incorporated by reference herein in its entirety.

What is claimed is:

1. An imaging apparatus comprising:
   a connector component which connects an imaging apparatus to a recording medium, the recording medium having a wireless communication unit for automatically transmitting image data stored in a predetermined folder which follows a design rule for the camera file system (DCF) standard to an external device;
   a first recording unit configured to record photographed image data in the predetermined folder which follows the DCF standard in the recording medium;
   a reducing unit configured to reduce the photographed image data to generate reduced image data;
   a second recording unit configured to record the reduced image data generated by the reducing unit in another folder, different from the predetermined folder, which doesn't follow the DCF standard in the recording medium; and
   a deletion unit configured to delete from the predetermined folder the photographed image data corresponding to the reduced image data generated by the reducing unit after the photographed image data stored in the predetermined folder is transmitted by the recording medium;
   wherein, before the photographed image data is stored in the predetermined folder, the first recording unit applies to the photographed image data an image number coming next to a largest image number of the reduced image data stored in said another folder, and stores the photographed image data in the predetermined folder.

2. The imaging apparatus according to claim 1, wherein the second recording unit applies information for prohibiting deletion of the reduced image data to the reduced image data and stores the reduced image data in said another folder.

3. The imaging apparatus according to claim 1, wherein to store the reduced image data in said another folder, the second recording unit uses identification information about that photographed image data before being reduced which corresponds to the reduced image data.

4. The imaging apparatus according to claim 1, further comprising:
   a sort unit configured to sort the photographed image data stored in the predetermined folder and the reduced image data stored in said another folder based on the image number; and
   a reproduction unit configured to reproduce the sorted images in a reproduction order matching at least one of a sorting order used by the sort unit and its reverse order.

5. A method for controlling an imaging apparatus which has a connector component which connects an imaging apparatus to a recording medium which has a wireless communication unit for automatically transmitting image data stored in a predetermined folder which follows a design rule for the camera file system (DCF) standard to an external device,
   the method comprising:
   first recording photographed image data in the predetermined folder which follows the DCF standard in the recording medium;
   reducing the photographed image data to generate reduced image data;
   second recording the reduced image data generated by a reducing process in another folder, different from the predetermined folder, which doesn't follow the DCF standard in the recording medium; and
   deleting from the predetermined folder the photographed image data corresponding to the reduced image data generated by the reducing after the photographed image data stored in the predetermined folder is transmitted by the recording medium;
   wherein, before the photographed image data is stored in the predetermined folder, the first recording applies to the photographed image data an image number coming next to a largest image number of the reduced image data stored in said another folder, and stores the photographed image data in the predetermined folder.

6. A non-transitory computer-readable storage medium storing a control program for causing a computer to perform a method, the method for controlling an imaging apparatus which has a connector component which connects an imaging apparatus to a recording medium which has a wireless communication unit for automatically transmitting image data stored in a predetermined folder which follows a design rule for the camera file system (DCF) standard to an external device, the method comprising:
   first recording photographed image data in the predetermined folder of which follows the DCF standard in the recording medium;
   reducing the photographed image data to generate reduced image data;
   second recording the reduced image data generated by a reducing process in another folder, different from the predetermined folder, which doesn't follow the DCF standard in the recording medium; and
   deleting from the predetermined folder the photographed image data corresponding to the reduced image data generated by the reducing after the photographed image data stored in the predetermined folder is transmitted by the recording medium;
   wherein, before the photographed image data is stored in the predetermined folder, the first recording applies to the photographed image data an image number coming next to a largest image number of the reduced image data stored in said another folder, and stores the photographed image data in the predetermined folder.

* * * * *